United States Patent [19]

Ackerman

[11] Patent Number: 4,844,201
[45] Date of Patent: Jul. 4, 1989

[54] RECIRCULATING OIL LUBRICATION SYSTEM FOR ROTARY RING LOG BARKERS

[75] Inventor: Robert T. Ackerman, Seattle, Wash.

[73] Assignee: Nicholson Manufacturing Company, Seattle, Wash.

[21] Appl. No.: 44,078

[22] Filed: Apr. 29, 1987

[51] Int. Cl.⁴ ............................ B27L 1/00; F16N 1/00
[52] U.S. Cl. ..................................... 184/6; 144/208 E
[58] Field of Search ............................ 184/6, 6.28, 31; 144/208 E

[56] References Cited

U.S. PATENT DOCUMENTS

| | | | |
|---|---|---|---|
| 2,821,220 | 1/1958 | Nicholson | 144/249 |
| 3,190,327 | 6/1965 | Robbins | 144/208 |
| 3,532,443 | 10/1970 | Johnson | 184/6 X |
| 4,122,877 | 10/1978 | Smith et al. | 144/208 E |
| 4,402,353 | 9/1983 | Pousette | 144/208 E |
| 4,519,429 | 5/1985 | Dreese | 144/208 E X |
| 4,566,371 | 1/1986 | Jorgensen et al. | 92/92 |

*Primary Examiner*—Leonard E. Smith
*Attorney, Agent, or Firm*—Robert W. Beach; Ward Brown

[57] ABSTRACT

Lubricating oil supplied to the annular antifriction bearing mounting a rotary ring log barker ring on ring-mounting means, and lubricating oil supplied to air seals for a rotary ring log barker annular air plenum chamber is returned to an annular oil-collecting chamber in the inner periphery of the rotary ring. From such oil-collecting chamber oil is scavenged by a stationary scoop tube in the upper portion of the rotary ring-mounting structure and drained by gravity to a reservoir from which it may be pumped for recirculation through the components of the barker requiring lubrication.

4 Claims, 2 Drawing Sheets

RECIRCULATING OIL LUBRICATION SYSTEM FOR ROTARY RING LOG BARKERS

BACKGROUND OF THE INVENTION

1. Field of the Invention

The present invention relates to lubricating systems for rotary ring log barkers and more particularly to a system in which lubricating oil is controllably removed from the log barker for recirculation or reconditioning.

2. Prior Art

Representative types of mechanical barkers of the rotary ring type in which the present invention can be used are illustrated by the barkers shown in FIG. 2 of Nicholson U.S. Pat. No. 2,821,220, issued Jan. 28, 1958; Robbins U.S. Pat. No. 3,190,327, issued June 22, 1965; and Jorgensen et al. U.S. Pat. No. 4,566,371, issued Jan. 28, 1986.

Each of the barkers shown in the aforesaid patents includes a rotary ring on which a plurality of barking arms are pivotally mounted to swing relative to the ring toward and away from a log moved through the ring, and ring-mounting structure having a naperture concentric with the rotary ring through which logs to be barked by the arms are moved axially of the ring.

The rotary ring is mounted on the stationary ring mounting structure by annular antifriction bearing means which must be lubricated and usually are lubricated by lubricating oil. Such lubricating oil is customarily supplied to the antifriction ring-mounted bearings under pressure, and such oil drains from the bearings to the bottom of the rotary ring from which it drains and is wasted.

SUMMARY OF THE INVENTION

The principal object of the invention is to collect and scavenge oil supplied to the annular antifriction bearing mounting the bearing ring and other parts of the barker that require lubrication, so that such oil can be conserved and reused such as by recirculation, or after reconditioning.

It is a specific object of the invention to minimize loss and waste of oil from a rotary ring log barker without decreasing the lubricating function of the oil.

Actually it is an object to be able economically to supply more oil for lubricating the barker than is customarily used with minimal loss of oil and attendant expense.

In addition, it is an object to make it feasible to use better quality and consequently more expensive oil without the loss which would normally be attendant on using such oil only once and having it wasted.

Another object is to control discharge of oil from a rotary ring log barker so that it will not be deposited on a log or bark removed from the log and thus contaminate it, making it undesirable or less desirable to use for some purposes.

It is a further object to accomplish the aforesaid objects by utilization of structure and mechanism which is simple and inexpensive.

The invention involves designing a rotary ring log barker to provide between the rotary ring and the ring-mounting means an annular rotary oil-collecting chamber to which is discharged oil that has been used to lubricate the annular antifriction mounting bearing for the rotary ring and other parts of the barker and to scavenge oil from the upper portion of such oil-collecting chamber by an upright scoop tube carried by the ring-mounting structure through which the oil will drain downward to a reservoir from which oil can be recirculated under pressure to the antifriction bearing mounting the rotary ring and other parts of the barker, or the oil returned to the reservoir can be reconditioned, if necessary, before being reused.

DETAILED DESCRIPTION

Figure 1:
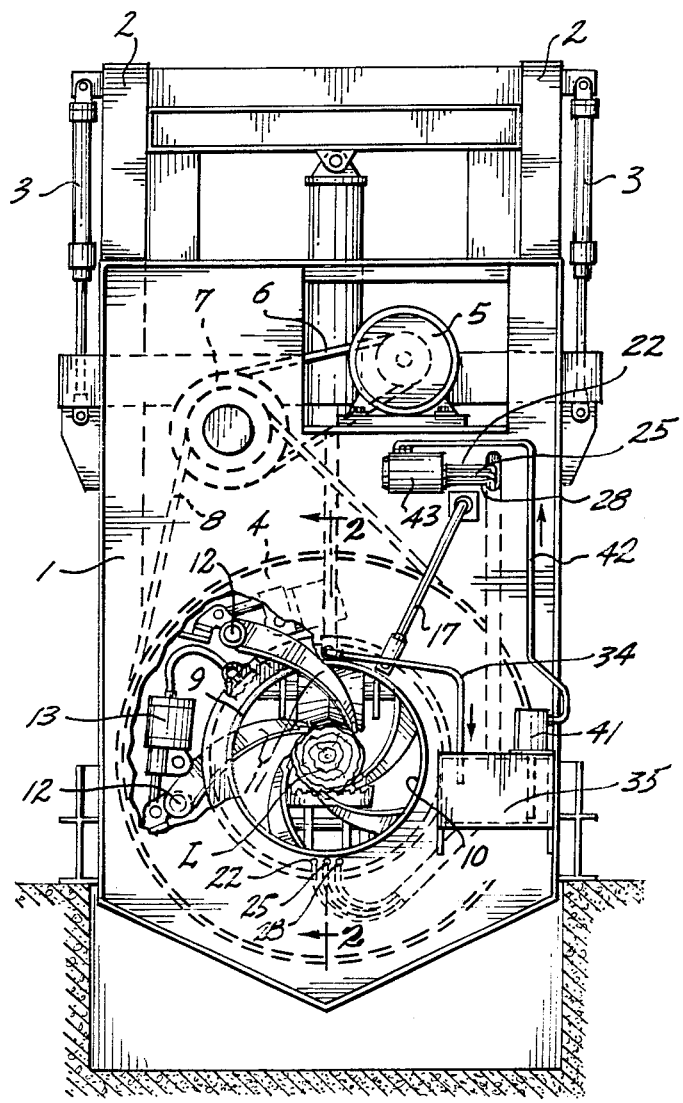
FIG. 1 is a front elevation of a rotary ring log barker of a representative type to which the present invention can be applied, parts being broken away.
Figure 2:
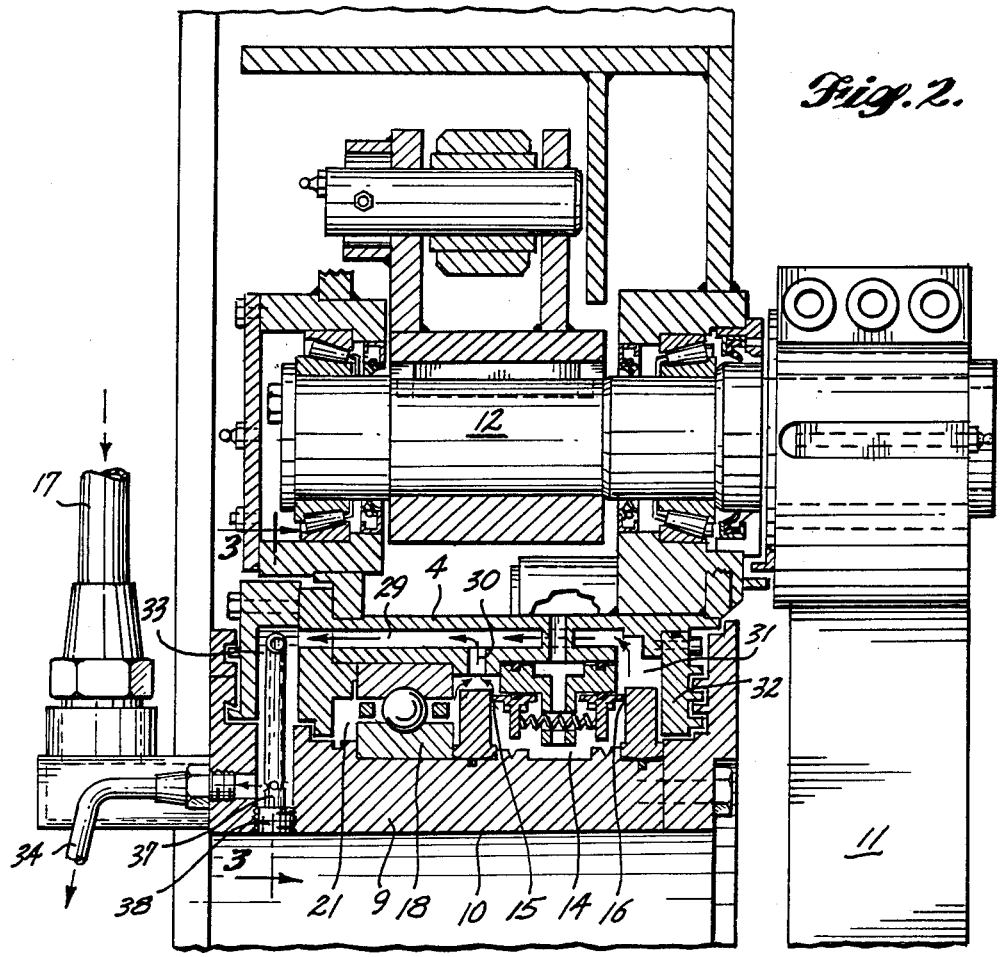
FIG. 2 is an enlarged vertical section through a portion of the log barker shown in FIG. 1, taken on line 2—2 of that figure.

The representative form of log barker shown in FIG. 1 includes a slide 1 movable elevationally relative to the barker frame along guides 2 by jacks 3 at opposite sides of the frame so as to center the rotary ring 4 with respect to a log L to be barked moved by a feed conveyor through the ring opening.

The rotary ring 4 is rotated relative to the slide 1 by an electric motor 5 driving a V-belt or chain belt 6, sheaves 7 carried by a countershaft and the main drive V-belt or chain belt 8 encircling the rotary ring.

Nonrotative ring-mounting structure 9 within the rotary ring 4 and carried by the slide 1 has a central log-encircling aperture 10 through which the log L can pass axially of the ring. The log is barked by barking arms 11 mounted by pivots 12 on the ring 4. Such arms can be swung conjointly relative to the ring to press their barking ends against the log L by pneumatic presser jacks 13. Air is supplied to such jacks from an annular air supply plenum chamber 14 between the rotary ring 4 and the ring-mounting means 9. The air under pressure is confined in the plenum chamber by an inner air seal 15 and an outer air seal 16 extending circumferentially of the rotary ring. Air is supplied to the plenum chamber through the ring-mounting structure 9 from an air supply conduit 17.

The rotary ring 4 is mounted on the stationary ring-mounting structure 9 by a large annular antifriction ring-mounting radial and thrust bearing 18. Such bearing not only mounts the rotary ring for rotation, but withstands the thrust axially of the ring produced by contact of the barking arms 11 with the log moving axially through the aperture 10.

It is necessary to provide oil for lubricating the annular antifriction bearing 10 and also the inner and outer seals 15 and 16 at opposite sides of the stationary plenum chamber 14. Ducts within the stationary ring-mounting structure 9 supply lubricating oil to such components. Duct 20 supplies oil to the annular oil supply chamber 21 along one axial side of the bearing 18 from a supply pipe 22. Oil is supplied to the inner air seal 15 through the stationary ducts 23 and 24 from the oil supply pipe 25. Oil is supplied to the outer air seal 16 through the stationary oil supply ducts 26 and 27 in the barker ring-mounting structure from the oil supply pipe 28. By supplying lubricating oil to these three components from separate supply pipes 22, 25 and 28, the amount of oil supplied to each of such components can be adjusted independently by suitable valving in the pipes 22, 25 and 28.

An annular rotary oil-collection chamber 29 for spent oil is formed in the inner peripheral portion of the rotary ring 4. Oil is discharged from the axial side of bearing opposite its axial side to which oil is supplied and from the inner seal 15 through radial ducts 30 in the inner periphery of the rotary barking ring to the rotary oil-collecting chamber 29. Also oil is discharged from the outer seal 16 to the oil-collecting chamber 29 through radial ducts 31. A labyrinthine seal 32 seals one axial end of the annular rotary oil-collecting chamber 29, and the other end of such chamber communicates with an annular trough 33 extending circumferentially around the rotary ring 4 and opening radially inwardly.

A return pipe 34 returns oil from the annular through 33 at one end of the oil-collecting chamber or passage 29 to a reservoir 35. As shown in FIG. 1, the oil return pipe 34 is inclined downward so that oil will drain from it by gravity.

A key feature of the present invention is the structure for scavenging oil from the annular rotary oil-collecting chamber 29 and conveying it to the stationary oil return pipe 34. Such features includes a stationary oil scoop pipe 37 in the upper portion, preferably at the top, of the stationary ring-mounting structure 9, with its base 38 anchored in such stationary structure. As shown best in FIG. 3, the scooping tube 37 has a scooping inlet opening 39 facing in the direction opposite the direction of rotation of the adjacent portion of the rotary ring 4.

Figure 3:
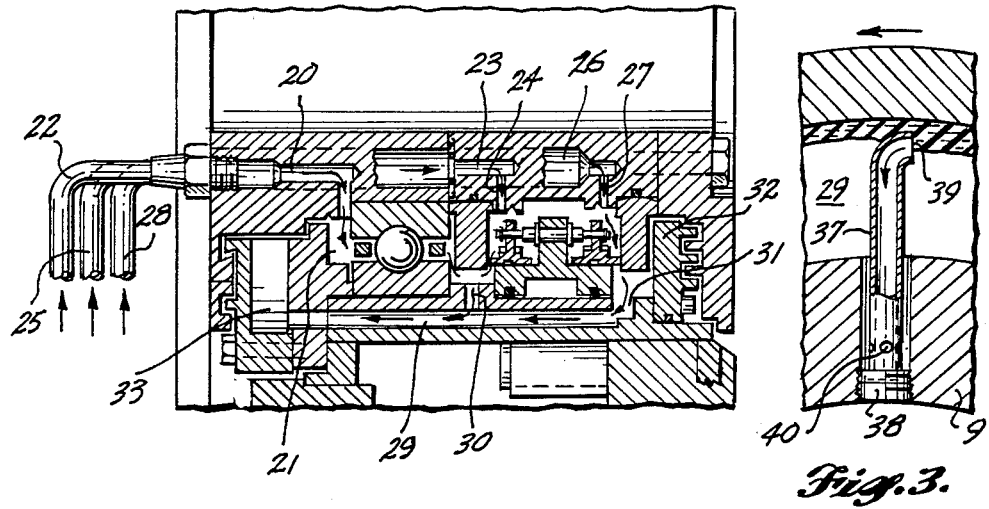
FIG. 3 is a fragmentary detail section on a further enlarged scale, taken along line 3—3 of FIG. 2.

Centrifugal force produced by the rotation of the rotary ring 4 impels the oil in the rotary oil-collecting chamber 29 to its outer periphery, so that the opening 39 of the scooping tube 37 will be immersed to a greater or lesser extent in the oil in the oilcollecting chamber as shown in FIG. 3. Oil entering the scooping tube will descend by gravity to its lower end, from which it will escape through apertures 40 to flow into the oil return or drainpipe 34.

Oil returned to the reservoir tank 35 can be recirculated to the bearing 18 and/or the inner air seal 15 and/or the outer air seal 16 by a pump 41 withdrawing oil from the reservoir 35 and discharging such oil through one or more of the oil supply pipes 22, 25 and 28. Alternatively, instead of recirculating the oil from the reservoir 35, oil could be supplied from a separate source to the pump 41, and the oil drained through the return pipe 34 could simply be discarded or salvaged for other purposes or reconditioned for reuse but such return insures that used oil will be collected in a controlled manner.

I claim:

1. A process for lubricating an annular antifriction bearing mounting a rotary barking ring on ring-mounting means which comprises supplying lubricating oil under pressure from a stationary source of oil under pressure to one axial side of the radially central portion of the annular antifriction bearing, rotating the rotary ring for discharging oil from the opposite axial side of the radially central portion of the annular antifriction bearing by centrifugal force to an annular oil-collecting chamber rotating with the rotary ring and for impelling oil in the annular rotating oil-collecting chamber to the outer periphery of such chamber by centrifugal force, scavenging oil by scooping it from the upper portion of such annular rotating oil-collecting chamber, and draining scavenged oil by gravity through the stationary ring-mounting means and collecting such scavenged oil.

2. The process defined in claim 1, including collecting the drained oil in a reservoir, withdrawing oil from the reservoir and forcing such oil through the ring-mounting means to the annular antifriction bearing mounting the barking ring.

3. In a rotary ring log barker including a rotary ring, barking arms pivotally mounted on the rotary ring for engagement with a log to be barked, and rotative pneumatic presser means for effecting swinging of the barking arms about their pivots, the combination comprising a rotary annular plenum chamber provided in the rotary ring for supplying air to the pneumatic presser means, stationary ring-mounting means including annular friction-bearing means having a stationary inner race and a rotatable outer race mounting the ring for rotation relative to said stationary inner bearing race and said stationary ring-mounting means, air supply means carried by said stationary ring-mounting means for supplying air under pressure to said rotary annular plenum chamber, air seal means for said rotary plenum chamber between said stationary ring-mounting means and the rotary ring, stationary oil-supply means carried by said stationary ring-mounting means for supplying lubricating oil under pressure to said antifriction bearing means, means for supplying oil to said air seal means from said stationary oil-supply means, said rotary ring forming an annular rotary oil-collecting chamber for receiving oil from said antifriction bearing means, means for draining oil from said air seal means to said rotary oil-collecting chamber, and stationary scavenging means carried by said stationary ringmounting means for removing oil from the rotary ring.

4. In a rotary ring log barker including a rotary barking ring, the combination comprising stationary ring-mounting means including annular antifriction bearing means having a stationary inner race and a rotatable outer race mounting the ring for rotation relative to said stationary inner bearing race and said stationary ring-mounting means, stationary oil-supply means carried by said stationary ring-mounting means supplying lubricating oil under pressure to one axial side of the radially central portion of said annular antifriction bearing means, an annular rotary oil-collecting chamber carried by and rotatable with said rotary ring for receiving oil from the opposite axial side of said radially central portion of said antifriction bearing means, means for rotating the rotary ring for impelling oil in said annular rotating oil-collecting chamber to the outer periphery of said chamber by centrifugal force, stationary scoop scavenging means carried by said stationary ring-mounting means in the upper portion of said annular rotating oil-collecting chamber for scooping oil from said chamber, and means for draining oil from said stationary scoop scavenging means by gravity through said stationary ring-mounting means and for collecting such scavenged oil.

* * * * *